(12) United States Patent
Jacobsen et al.

(10) Patent No.: US 12,468,182 B2
(45) Date of Patent: Nov. 11, 2025

(54) ELECTROPHORETIC DISPLAY WITH LOW PROFILE EDGE SEAL

(71) Applicant: E INK CORPORATION, Billerica, MA (US)

(72) Inventors: Keith A Jacobsen, Walpole, MA (US); George G. Harris, Woburn, MA (US); Jennifer B. Lampron, Newton, NH (US); Eric J. Duchaine, East Hampstead, NH (US); Samantha Morrill, Nashua, NH (US); Crystal Nguyen, Bedford, MA (US); Richard J. Paolini, Jr., Framingham, MA (US); Nishit Murari, Westford, MA (US); John L. Chuma, Westborough, MA (US)

(73) Assignee: E INK CORPORATION, Billerica, MA (US)

( * ) Notice: Subject to any disclaimer, the term of this patent is extended or adjusted under 35 U.S.C. 154(b) by 763 days.

(21) Appl. No.: 17/720,527

(22) Filed: Apr. 14, 2022

(65) Prior Publication Data

US 2022/0334448 A1    Oct. 20, 2022

Related U.S. Application Data

(60) Provisional application No. 63/187,972, filed on May 13, 2021, provisional application No. 63/175,935, filed on Apr. 16, 2021.

(51) Int. Cl.
*G02F 1/01*    (2006.01)
*G02F 1/167*    (2019.01)
(Continued)

(52) U.S. Cl.
CPC ............... *G02F 1/01* (2013.01); *G02F 1/167* (2013.01); *G02F 1/1676* (2019.01); *G02F 1/1679* (2019.01); *G02F 2202/28* (2013.01)

(58) Field of Classification Search
CPC ............ G02B 26/00–10; G02F 1/1679; G02F 1/1676; G02F 1/167; G02F 1/01; G02F 2202/28
See application file for complete search history.

(56) References Cited

U.S. PATENT DOCUMENTS

| 4,418,346 A | 11/1983 | Batchelder |
| 5,872,552 A | 2/1999 | Gordon, II et al. |

(Continued)

FOREIGN PATENT DOCUMENTS

| JP | 2007178706 A | 7/2007 |
| JP | 2009093108 A | 4/2009 |

(Continued)

OTHER PUBLICATIONS

Korean Intellectual Property Office, "International Search Report and Written Opinion", PCT/US2022/024765, Jul. 25, 2022.

(Continued)

*Primary Examiner* — Stephone B Allen
*Assistant Examiner* — Tamara Y. Washington
(74) *Attorney, Agent, or Firm* — Quarles & Brady, LLP (57) ABSTRACT

Electrophoretic display modules including various types of backplane and edge seals for protecting electro-optic displays against environmental contaminants are described. In particular, the disclosed module designs allow for very narrow edge seals, i.e., less than 1 mm in thickness. In one type of seal, the electro-optic layer is sandwiched between a backplane and a protective sheet and a sealing material extends between the backplane and the protective sheet. In some instances, the protective sheet includes several layers (Continued)

of transparent materials to provide physical protection and reduce the ingress of water.

12 Claims, 5 Drawing Sheets

(51) Int. Cl.
*G02F 1/1676* (2019.01)
*G02F 1/1679* (2019.01)

(56) References Cited

U.S. PATENT DOCUMENTS

| | | |
|---|---|---|
| 5,930,026 A | 7/1999 | Jacobson et al. |
| 5,961,804 A | 10/1999 | Jacobson et al. |
| 6,017,584 A | 1/2000 | Albert et al. |
| 6,067,185 A | 5/2000 | Albert et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,130,774 A | 10/2000 | Albert et al. |
| 6,144,361 A | 11/2000 | Gordon, II et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,786 B1 | 5/2002 | Albert |
| 6,413,790 B1 | 7/2002 | Duthaler et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,531,997 B1 | 3/2003 | Gates et al. |
| 6,538,801 B2 | 3/2003 | Jacobson et al. |
| 6,545,291 B1 | 4/2003 | Amundson et al. |
| 6,545,797 B2 | 4/2003 | Chen et al. |
| 6,573,652 B1 | 6/2003 | Graff et al. |
| 6,580,545 B2 | 6/2003 | Morrison et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,751,007 B2 | 6/2004 | Liang et al. |
| 6,753,067 B2 | 6/2004 | Chen et al. |
| 6,753,999 B2 | 6/2004 | Zehner et al. |
| 6,781,745 B2 | 8/2004 | Chung et al. |
| 6,788,449 B2 | 9/2004 | Liang et al. |
| 6,788,452 B2 | 9/2004 | Liang et al. |
| 6,795,229 B2 | 9/2004 | Liang et al. |
| 6,806,995 B2 | 10/2004 | Chung et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,829,078 B2 | 12/2004 | Liang et al. |
| 6,831,769 B2 | 12/2004 | Holman et al. |
| 6,831,770 B2 | 12/2004 | Liang et al. |
| 6,831,771 B2 | 12/2004 | Ho et al. |
| 6,833,943 B2 | 12/2004 | Liang et al. |
| 6,839,158 B2 | 1/2005 | Albert et al. |
| 6,842,279 B2 | 1/2005 | Amundson |
| 6,842,657 B1 | 1/2005 | Drzaic et al. |
| 6,850,355 B2 | 2/2005 | Liang et al. |
| 6,865,010 B2 | 3/2005 | Duthaler et al. |
| 6,865,012 B2 | 3/2005 | Liang et al. |
| 6,866,760 B2 | 3/2005 | Paolini Jr. et al. |
| 6,870,661 B2 | 3/2005 | Pullen et al. |
| 6,870,662 B2 | 3/2005 | Tseng et al. |
| 6,873,452 B2 | 3/2005 | Tseng et al. |
| 6,885,495 B2 | 4/2005 | Liang et al. |
| 6,900,851 B2 | 5/2005 | Morrison et al. |
| 6,909,532 B2 | 6/2005 | Chung et al. |
| 6,922,276 B2 | 7/2005 | Zhang et al. |
| 6,927,892 B2 | 8/2005 | Ho et al. |
| 6,930,818 B1 | 8/2005 | Liang et al. |
| 6,933,098 B2 | 8/2005 | Chan-Park et al. |
| 6,947,202 B2 | 9/2005 | Liang et al. |
| 6,956,690 B2 | 10/2005 | Yu et al. |
| 6,958,848 B2 | 10/2005 | Cao et al. |
| 6,958,849 B2 | 10/2005 | Chen et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,052,766 B2 | 5/2006 | Zang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,079,303 B2 | 7/2006 | Hou et al. |
| 7,106,296 B1 | 9/2006 | Jacobson |
| 7,110,162 B2 | 9/2006 | Wu et al. |
| 7,110,163 B2 | 9/2006 | Webber et al. |
| 7,110,164 B2 | 9/2006 | Paolini, Jr. et al. |
| 7,113,323 B2 | 9/2006 | Ho et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,141,279 B2 | 11/2006 | Liang et al. |
| 7,141,688 B2 | 11/2006 | Feng et al. |
| 7,142,351 B2 | 11/2006 | Chung et al. |
| 7,148,128 B2 | 12/2006 | Jacobson |
| 7,156,945 B2 | 1/2007 | Chaug |
| 7,158,282 B2 | 1/2007 | Liang et al. |
| 7,166,182 B2 | 1/2007 | Pereira et al. |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,177,066 B2 | 2/2007 | Chung et al. |
| 7,184,197 B2 | 2/2007 | Liang et al. |
| 7,190,008 B2 | 3/2007 | Amundson et al. |
| 7,193,625 B2 | 3/2007 | Danner et al. |

(56) References Cited

U.S. PATENT DOCUMENTS

| | | | |
|---|---|---|---|
| 7,198,832 B2 | 4/2007 | Burrows et al. |
| 7,202,847 B2 | 4/2007 | Gates |
| 7,202,991 B2 | 4/2007 | Zhang et al. |
| 7,205,355 B2 | 4/2007 | Liang et al. |
| 7,206,119 B2 | 4/2007 | Honeyman et al. |
| 7,223,672 B2 | 5/2007 | Kazlas et al. |
| 7,226,550 B2 | 6/2007 | Hou et al. |
| 7,230,750 B2 | 6/2007 | Whitesides et al. |
| 7,230,751 B2 | 6/2007 | Whitesides et al. |
| 7,233,429 B2 | 6/2007 | Liang |
| 7,236,290 B1 | 6/2007 | Zhang et al. |
| 7,256,766 B2 | 8/2007 | Albert et al. |
| 7,259,744 B2 | 8/2007 | Arango et al. |
| 7,261,920 B2 | 8/2007 | Haubrich et al. |
| 7,271,947 B2 | 9/2007 | Liang et al. |
| 7,277,218 B2 | 10/2007 | Hwang et al. |
| 7,286,279 B2 | 10/2007 | Yu et al. |
| 7,301,693 B2 | 11/2007 | Chaug et al. |
| 7,304,780 B2 | 12/2007 | Liu et al. |
| 7,307,778 B2 | 12/2007 | Wang et al. |
| 7,312,916 B2 | 12/2007 | Pullen et al. |
| 7,327,346 B2 | 2/2008 | Chung et al. |
| 7,327,511 B2 | 2/2008 | Whitesides et al. |
| 7,339,715 B2 | 3/2008 | Webber et al. |
| 7,347,957 B2 | 3/2008 | Wu et al. |
| 7,365,733 B2 | 4/2008 | Duthaler et al. |
| 7,374,634 B2 | 5/2008 | Wang et al. |
| 7,382,514 B2 | 6/2008 | Hsu et al. |
| 7,385,751 B2 | 6/2008 | Chen et al. |
| 7,388,572 B2 | 6/2008 | Duthaler et al. |
| 7,390,901 B2 | 6/2008 | Yang et al. |
| 7,401,758 B2 | 7/2008 | Liang et al. |
| 7,408,696 B2 | 8/2008 | Liang et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,470,386 B2 | 12/2008 | Kang et al. |
| 7,473,782 B2 | 1/2009 | Yang et al. |
| 7,477,444 B2 | 1/2009 | Cao et al. |
| 7,492,339 B2 | 2/2009 | Amundson |
| 7,492,497 B2 | 2/2009 | Paolini, Jr. et al. |
| 7,492,505 B2 | 2/2009 | Liang et al. |
| 7,504,050 B2 | 3/2009 | Weng et al. |
| 7,528,822 B2 | 5/2009 | Amundson et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,557,981 B2 | 7/2009 | Liang et al. |
| 7,560,004 B2 | 7/2009 | Pereira et al. |
| 7,561,324 B2 | 7/2009 | Duthaler et al. |
| 7,564,614 B2 | 7/2009 | Chen et al. |
| 7,572,394 B2 | 8/2009 | Gu et al. |
| 7,572,491 B2 | 8/2009 | Wang et al. |
| 7,576,904 B2 | 8/2009 | Chung et al. |
| 7,580,180 B2 | 8/2009 | Ho et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,612,760 B2 | 11/2009 | Kawai |
| 7,616,374 B2 | 11/2009 | Chen et al. |
| 7,636,191 B2 | 12/2009 | Duthaler et al. |
| 7,649,666 B2 | 1/2010 | Isobe et al. |
| 7,649,674 B2 | 1/2010 | Danner et al. |
| 7,660,033 B2 * | 2/2010 | Uchida ............ G02F 1/16757 345/84 |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini, Jr. et al. |
| 7,683,606 B2 | 3/2010 | Kang et al. |
| 7,688,497 B2 | 3/2010 | Danner et al. |
| 7,715,087 B2 | 5/2010 | Hou et al. |
| 7,715,088 B2 | 5/2010 | Liang et al. |
| 7,728,811 B2 | 6/2010 | Albert et al. |
| 7,767,126 B2 | 8/2010 | Kang et al. |
| 7,787,169 B2 | 8/2010 | Abramson et al. |
| 7,826,129 B2 | 11/2010 | Wu et al. |
| 7,830,592 B1 | 11/2010 | Sprague et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,848,006 B2 | 12/2010 | Wilcox et al. |
| 7,848,007 B2 | 12/2010 | Paolini, Jr. et al. |
| 7,859,742 B1 | 12/2010 | Chiu et al. |
| 7,880,958 B2 | 2/2011 | Zang et al. |
| 7,893,435 B2 | 2/2011 | Kazlas et al. |
| 7,903,319 B2 | 3/2011 | Honeyman et al. |
| 7,905,977 B2 | 3/2011 | Qi et al. |
| 7,910,175 B2 | 3/2011 | Webber |
| 7,952,557 B2 | 5/2011 | Amundson |
| 7,952,790 B2 | 5/2011 | Honeyman et al. |
| 7,982,479 B2 | 7/2011 | Wang et al. |
| 7,982,941 B2 | 7/2011 | Lin et al. |
| 7,984,108 B2 | 7/2011 | Landis et al. |
| 7,986,450 B2 | 7/2011 | Cao et al. |
| 7,999,787 B2 | 8/2011 | Amundson et al. |
| 8,002,948 B2 | 8/2011 | Haubrich et al. |
| 8,009,348 B2 | 8/2011 | Zehner et al. |
| 8,011,592 B2 | 9/2011 | Wang |
| 8,018,640 B2 | 9/2011 | Whitesides et al. |
| 8,034,209 B2 | 10/2011 | Danner et al. |
| 8,040,594 B2 | 10/2011 | Paolini, Jr. et al. |
| 8,049,947 B2 | 11/2011 | Danner et al. |
| 8,054,526 B2 | 11/2011 | Bouchard |
| 8,072,675 B2 | 12/2011 | Lin et al. |
| 8,098,418 B2 | 1/2012 | Paolini, Jr. et al. |
| 8,115,729 B2 | 2/2012 | Danner et al. |
| 8,120,836 B2 | 2/2012 | Lin et al. |
| 8,125,501 B2 | 2/2012 | Amundson et al. |
| 8,129,655 B2 | 3/2012 | Jacobson et al. |
| 8,139,050 B2 | 3/2012 | Jacobson et al. |
| 8,154,790 B2 | 4/2012 | Wang et al. |
| 8,159,636 B2 | 4/2012 | Sun et al. |
| 8,169,690 B2 | 5/2012 | Lin et al. |
| 8,174,490 B2 | 5/2012 | Whitesides et al. |
| 8,177,942 B2 | 5/2012 | Paolini, Jr. et al. |
| 8,237,892 B1 | 8/2012 | Sprague et al. |
| 8,243,013 B1 | 8/2012 | Sprague et al. |
| 8,257,614 B2 | 9/2012 | Gu et al. |
| 8,270,064 B2 | 9/2012 | Feick et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,361,356 B2 | 1/2013 | Zang et al. |
| 8,362,488 B2 | 1/2013 | Chaug et al. |
| 8,363,299 B2 | 1/2013 | Paolini, Jr. et al. |
| 8,363,306 B2 | 1/2013 | Du et al. |
| 8,373,649 B2 | 2/2013 | Low et al. |
| 8,384,658 B2 | 2/2013 | Albert et al. |
| 8,390,301 B2 | 3/2013 | Danner et al. |
| 8,390,918 B2 | 3/2013 | Wilcox et al. |
| 8,395,836 B2 | 3/2013 | Lin |
| 8,422,116 B2 | 4/2013 | Sprague et al. |
| 8,437,069 B2 | 5/2013 | Lin |
| 8,437,073 B2 | 5/2013 | Hsieh et al. |
| 8,441,414 B2 | 5/2013 | Lin |
| 8,441,432 B2 | 5/2013 | Zang et al. |
| 8,446,664 B2 | 5/2013 | Chen et al. |
| 8,456,414 B2 | 6/2013 | Lin et al. |
| 8,456,589 B1 | 6/2013 | Sprague et al. |
| 8,462,102 B2 | 6/2013 | Wong et al. |
| 8,503,063 B2 | 8/2013 | Sprague |
| 8,514,168 B2 | 8/2013 | Chung et al. |
| 8,537,105 B2 | 9/2013 | Chiu et al. |
| 8,547,628 B2 | 10/2013 | Wu et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,162 B2 | 11/2013 | Kang |
| 8,576,164 B2 | 11/2013 | Sprague et al. |
| 8,576,259 B2 | 11/2013 | Lin et al. |
| 8,576,470 B2 | 11/2013 | Paolini, Jr. et al. |

(56) References Cited

U.S. PATENT DOCUMENTS

| | | | |
|---|---|---|---|
| 8,576,475 | B2 | 11/2013 | Huang et al. |
| 8,582,196 | B2 | 11/2013 | Walls et al. |
| 8,598,787 | B2 | 12/2013 | Cornelis et al. |
| 8,605,032 | B2 | 12/2013 | Liu et al. |
| 8,605,354 | B2 | 12/2013 | Zhang et al. |
| 8,610,988 | B2 | 12/2013 | Zehner et al. |
| 8,625,188 | B2 | 1/2014 | Wang et al. |
| 8,649,084 | B2 | 2/2014 | Wang et al. |
| 8,654,436 | B1 | 2/2014 | Feick |
| 8,665,206 | B2 | 3/2014 | Lin et al. |
| 8,670,174 | B2 | 3/2014 | Sprague et al. |
| 8,679,608 | B2 | 3/2014 | Lesage et al. |
| 8,681,191 | B2 | 3/2014 | Yang et al. |
| 8,704,756 | B2 | 4/2014 | Lin |
| 8,714,780 | B2 | 5/2014 | Ho et al. |
| 8,717,664 | B2 | 5/2014 | Wang et al. |
| 8,743,077 | B1 | 6/2014 | Sprague |
| 8,754,859 | B2 | 6/2014 | Gates et al. |
| 8,786,935 | B2 | 7/2014 | Sprague |
| 8,797,258 | B2 | 8/2014 | Sprague |
| 8,797,633 | B1 | 8/2014 | Sprague et al. |
| 8,797,634 | B2 | 8/2014 | Paolini, Jr. et al. |
| 8,797,636 | B2 | 8/2014 | Yang et al. |
| 8,809,442 | B2 | 8/2014 | Kageyama |
| 8,810,525 | B2 | 8/2014 | Sprague |
| 8,830,561 | B2 | 9/2014 | Zang et al. |
| 8,873,129 | B2 | 10/2014 | Paolini, Jr. et al. |
| 8,891,156 | B2 | 11/2014 | Yang et al. |
| 8,902,153 | B2 | 12/2014 | Bouchard et al. |
| 8,902,491 | B2 | 12/2014 | Wang et al. |
| 8,917,439 | B2 | 12/2014 | Wang et al. |
| 8,928,562 | B2 | 1/2015 | Gates et al. |
| 8,928,641 | B2 | 1/2015 | Chiu et al. |
| 8,961,831 | B2 | 2/2015 | Du et al. |
| 8,964,282 | B2 | 2/2015 | Wang et al. |
| 8,973,837 | B2 | 3/2015 | Tsai et al. |
| 8,976,444 | B2 | 3/2015 | Zhang et al. |
| 9,013,394 | B2 | 4/2015 | Lin |
| 9,013,783 | B2 | 4/2015 | Sprague |
| 9,019,197 | B2 | 4/2015 | Lin |
| 9,019,198 | B2 | 4/2015 | Lin et al. |
| 9,019,318 | B2 | 4/2015 | Sprague et al. |
| 9,025,234 | B2 | 5/2015 | Lin |
| 9,025,238 | B2 | 5/2015 | Chan et al. |
| 9,030,374 | B2 | 5/2015 | Sprague et al. |
| 9,052,564 | B2 | 6/2015 | Sprague et al. |
| 9,082,352 | B2 | 7/2015 | Cheng et al. |
| 9,112,181 | B2 | 8/2015 | Yamae et al. |
| 9,116,412 | B2 | 8/2015 | Lin |
| 9,140,952 | B2 | 9/2015 | Sprague et al. |
| 9,146,439 | B2 | 9/2015 | Zhang |
| 9,147,364 | B2 | 9/2015 | Wu et al. |
| 9,170,468 | B2 | 10/2015 | Lin et al. |
| 9,188,829 | B2 | 11/2015 | Li et al. |
| 9,195,111 | B2 | 11/2015 | Anseth et al. |
| 9,197,704 | B2 | 11/2015 | Sun et al. |
| 9,199,441 | B2 | 12/2015 | Danner |
| 9,201,279 | B2 | 12/2015 | Wu et al. |
| 9,218,773 | B2 | 12/2015 | Sun et al. |
| 9,223,164 | B2 | 12/2015 | Lai et al. |
| 9,224,338 | B2 | 12/2015 | Chan et al. |
| 9,224,342 | B2 | 12/2015 | Sprague et al. |
| 9,224,344 | B2 | 12/2015 | Chung et al. |
| 9,230,492 | B2 | 1/2016 | Harrington et al. |
| 9,238,340 | B2 | 1/2016 | Kayal et al. |
| 9,251,736 | B2 | 2/2016 | Lin et al. |
| 9,262,973 | B2 | 2/2016 | Wu et al. |
| 9,279,906 | B2 | 3/2016 | Kang |
| 9,285,648 | B2 | 3/2016 | Liu et al. |
| 9,285,649 | B2 | 3/2016 | Du et al. |
| 9,291,872 | B1 | 3/2016 | Lin et al. |
| 9,299,294 | B2 | 3/2016 | Lin et al. |
| 9,341,915 | B2 | 5/2016 | Yang et al. |
| 9,341,916 | B2 | 5/2016 | Telfer et al. |
| 9,346,987 | B2 | 5/2016 | Wang et al. |
| 9,348,193 | B2 | 5/2016 | Hiji et al. |
| 9,360,733 | B2 | 6/2016 | Wang et al. |
| 9,361,836 | B1 | 6/2016 | Telfer et al. |
| 9,366,935 | B2 | 6/2016 | Du et al. |
| 9,372,380 | B2 | 6/2016 | Du et al. |
| 9,382,427 | B2 | 7/2016 | Du et al. |
| 9,383,623 | B2 | 7/2016 | Lin et al. |
| 9,388,307 | B2 | 7/2016 | Li et al. |
| 9,390,066 | B2 | 7/2016 | Smith et al. |
| 9,390,661 | B2 | 7/2016 | Chiu et al. |
| 9,423,666 | B2 | 8/2016 | Wang et al. |
| 9,424,800 | B2 | 8/2016 | Abe et al. |
| 9,428,649 | B2 | 8/2016 | Li et al. |
| 9,436,056 | B2 | 9/2016 | Paolini, Jr. et al. |
| 9,436,057 | B2 | 9/2016 | Kang et al. |
| 9,436,058 | B2 | 9/2016 | Li et al. |
| 9,454,057 | B2 | 9/2016 | Wu et al. |
| 9,459,510 | B2 | 10/2016 | Lin |
| 9,460,666 | B2 | 10/2016 | Sprague et al. |
| 9,470,917 | B2 | 10/2016 | Lin et al. |
| 9,470,950 | B2 | 10/2016 | Paolini, Jr. et al. |
| 9,491,879 | B2 | 11/2016 | Cheng et al. |
| 9,495,918 | B2 | 11/2016 | Harrington et al. |
| 9,501,981 | B2 | 11/2016 | Lin et al. |
| 9,506,243 | B1 | 11/2016 | Harris et al. |
| 9,513,527 | B2 | 12/2016 | Chan et al. |
| 9,513,743 | B2 | 12/2016 | Sjodin et al. |
| 9,514,667 | B2 | 12/2016 | Lin |
| 9,529,240 | B2 | 12/2016 | Paolini, Jr. et al. |
| 9,530,363 | B2 | 12/2016 | Ben-Dov et al. |
| 9,541,814 | B2 | 1/2017 | Lin et al. |
| 9,557,623 | B2 | 1/2017 | Wang et al. |
| 9,582,041 | B2 | 2/2017 | Cheng et al. |
| 9,620,048 | B2 | 4/2017 | Sim et al. |
| 9,620,066 | B2 | 4/2017 | Bishop |
| 9,627,916 | B2 | 4/2017 | Hsieh et al. |
| 9,632,373 | B2 | 4/2017 | Huang et al. |
| 9,640,119 | B2 | 5/2017 | Lin et al. |
| 9,646,547 | B2 | 5/2017 | Lin et al. |
| 9,666,142 | B2 | 5/2017 | Hung |
| 9,670,367 | B2 | 6/2017 | Li et al. |
| 9,671,635 | B2 | 6/2017 | Paolini, Jr. |
| 9,671,667 | B2 | 6/2017 | Yamamoto |
| 9,671,668 | B2 | 6/2017 | Chan et al. |
| 9,672,766 | B2 | 6/2017 | Sjodin |
| 9,688,859 | B2 | 6/2017 | Yezek et al. |
| 9,691,333 | B2 | 6/2017 | Cheng et al. |
| 9,697,778 | B2 | 7/2017 | Telfer et al. |
| 9,715,155 | B1 | 7/2017 | Subramanian et al. |
| 9,721,495 | B2 | 8/2017 | Harrington et al. |
| 9,726,957 | B2 | 8/2017 | Telfer et al. |
| 9,752,034 | B2 | 9/2017 | Wu et al. |
| 9,759,978 | B2 | 9/2017 | Liu |
| 9,759,980 | B2 | 9/2017 | Du et al. |
| 9,759,981 | B2 | 9/2017 | Wang et al. |
| 9,765,015 | B2 | 9/2017 | Shao et al. |
| 9,777,201 | B2 | 10/2017 | Widger et al. |
| 9,778,535 | B2 | 10/2017 | Gan et al. |
| 9,778,537 | B2 | 10/2017 | Wang et al. |
| 9,779,670 | B2 | 10/2017 | Jesaka et al. |
| 9,779,671 | B2 | 10/2017 | Gan et al. |
| 9,786,233 | B2 | 10/2017 | Hung |
| 9,792,861 | B2 | 10/2017 | Chang et al. |
| 9,792,862 | B2 | 10/2017 | Hung et al. |
| 9,812,073 | B2 | 11/2017 | Lin et al. |
| 9,835,925 | B1 | 12/2017 | Bull et al. |
| 9,835,926 | B2 | 12/2017 | Sprague et al. |
| 9,880,646 | B2 | 1/2018 | Sainis et al. |
| 9,897,891 | B2 | 2/2018 | Harris et al. |
| 9,919,553 | B2 | 3/2018 | Kang et al. |
| 9,921,422 | B2 | 3/2018 | Danner et al. |
| 9,921,451 | B2 | 3/2018 | Telfer et al. |
| 9,922,603 | B2 | 3/2018 | Lin |
| 9,928,810 | B2 | 3/2018 | Harrington et al. |
| 9,953,588 | B1 | 4/2018 | Telfer et al. |
| 9,995,987 | B1 | 6/2018 | Telfer et al. |
| 10,031,394 | B2 | 7/2018 | Nakayama et al. |
| 10,032,419 | B2 | 7/2018 | Lin et al. |
| 10,036,929 | B2 | 7/2018 | Du et al. |

(56) References Cited

U.S. PATENT DOCUMENTS

| | | | |
|---|---|---|---|
| 10,037,089 B2 | 7/2018 | Bishop et al. |
| 10,037,735 B2 | 7/2018 | Amundson |
| 10,040,954 B2 | 8/2018 | Du et al. |
| 10,061,123 B2 | 8/2018 | Shao et al. |
| 10,062,337 B2 | 8/2018 | Lin et al. |
| 10,162,242 B2 | 12/2018 | Wang et al. |
| 10,185,200 B1 * | 1/2019 | Sprague | G02F 1/133305 |
| 10,190,743 B2 | 1/2019 | Hertel et al. |
| 10,209,556 B2 | 2/2019 | Rosenfeld et al. |
| 10,229,641 B2 | 3/2019 | Yang et al. |
| 10,319,313 B2 | 6/2019 | Harris et al. |
| 10,324,577 B2 | 6/2019 | Sainis et al. |
| 10,331,005 B2 | 6/2019 | Hertel et al. |
| 10,332,435 B2 | 6/2019 | Wang et al. |
| 10,339,876 B2 | 7/2019 | Lin et al. |
| 10,343,237 B2 | 7/2019 | Sercel et al. |
| 10,353,266 B2 | 7/2019 | Bouchard et al. |
| 10,365,533 B2 | 7/2019 | Matsumoto |
| 10,366,647 B2 | 7/2019 | Szymborski |
| 10,372,008 B2 | 8/2019 | Telfer et al. |
| 10,380,931 B2 | 8/2019 | Lin et al. |
| 10,380,955 B2 | 8/2019 | Lin |
| 10,388,233 B2 | 8/2019 | Paolini, Jr. et al. |
| 10,401,668 B2 | 9/2019 | Lin et al. |
| 10,431,168 B2 | 10/2019 | Lin et al. |
| 10,444,592 B2 | 10/2019 | Bouchard |
| 10,446,585 B2 | 10/2019 | Harris et al. |
| 10,466,565 B2 | 11/2019 | Anseth et al. |
| 10,467,984 B2 | 11/2019 | Buckley et al. |
| 10,475,396 B2 | 11/2019 | Sim et al. |
| 10,495,941 B2 | 12/2019 | Hashimoto et al. |
| 10,503,041 B2 | 12/2019 | Harris et al. |
| 10,504,457 B2 | 12/2019 | Wang et al. |
| 10,509,294 B2 | 12/2019 | Telfer |
| 10,613,407 B2 | 4/2020 | Lin et al. |
| 10,672,350 B2 | 6/2020 | Amundson et al. |
| 10,761,395 B2 | 9/2020 | Du et al. |
| 11,314,141 B2 | 4/2022 | Lo et al. |
| 2002/0060321 A1 | 5/2002 | Kazlas et al. |
| 2002/0090980 A1 | 7/2002 | Wilcox et al. |
| 2002/0188053 A1 | 12/2002 | Zang et al. |
| 2003/0048522 A1 | 3/2003 | Liang et al. |
| 2003/0102858 A1 | 6/2003 | Jacobson et al. |
| 2003/0151029 A1 | 8/2003 | Hsu et al. |
| 2003/0203101 A1 | 10/2003 | Haubrich et al. |
| 2004/0030125 A1 | 2/2004 | Li et al. |
| 2004/0085619 A1 | 5/2004 | Wu et al. |
| 2004/0105036 A1 | 6/2004 | Danner et al. |
| 2004/0119681 A1 | 6/2004 | Albert et al. |
| 2004/0120024 A1 | 6/2004 | Chen et al. |
| 2004/0219306 A1 | 11/2004 | Wang et al. |
| 2004/0246562 A1 | 12/2004 | Chung et al. |
| 2005/0012980 A1 | 1/2005 | Wilcox et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0253777 A1 | 11/2005 | Zehner et al. |
| 2006/0229402 A1 | 10/2006 | Varma |
| 2006/0255322 A1 | 11/2006 | Wu et al. |
| 2007/0091417 A1 | 4/2007 | Cao et al. |
| 2007/0103427 A1 | 5/2007 | Zhou et al. |
| 2007/0176912 A1 | 8/2007 | Beames et al. |
| 2007/0237962 A1 | 10/2007 | Liang et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0136774 A1 | 6/2008 | Harris et al. |
| 2008/0239460 A1 | 10/2008 | Shimizu et al. |
| 2008/0303780 A1 | 12/2008 | Sprague et al. |
| 2009/0009852 A1 | 1/2009 | Honeyman et al. |
| 2009/0122389 A1 | 5/2009 | Whitesides et al. |
| 2010/0148385 A1 | 6/2010 | Balko et al. |
| 2010/0156780 A1 | 6/2010 | Jacobson et al. |
| 2010/0177396 A1 | 7/2010 | Lin |
| 2010/0194733 A1 | 8/2010 | Lin et al. |
| 2010/0194789 A1 | 8/2010 | Lin et al. |
| 2010/0265561 A1 | 10/2010 | Gates et al. |
| 2011/0043543 A1 | 2/2011 | Chen et al. |
| 2011/0063314 A1 | 3/2011 | Chiu et al. |
| 2011/0164301 A1 | 7/2011 | Paolini, Jr. et al. |
| 2011/0175875 A1 | 7/2011 | Lin et al. |
| 2011/0217639 A1 | 9/2011 | Sprague |
| 2011/0221740 A1 | 9/2011 | Yang et al. |
| 2011/0292319 A1 | 12/2011 | Cole |
| 2012/0001957 A1 | 1/2012 | Liu et al. |
| 2012/0049125 A1 | 3/2012 | Du et al. |
| 2012/0098740 A1 | 4/2012 | Chiu et al. |
| 2013/0063333 A1 | 3/2013 | Arango et al. |
| 2013/0161565 A1 | 6/2013 | Laxton |
| 2013/0176288 A1 | 7/2013 | Hung et al. |
| 2013/0193385 A1 | 8/2013 | Li et al. |
| 2013/0221112 A1 | 8/2013 | Lai et al. |
| 2013/0244149 A1 | 9/2013 | Wang et al. |
| 2013/0249782 A1 | 9/2013 | Wu et al. |
| 2014/0011913 A1 | 1/2014 | Du et al. |
| 2014/0049808 A1 | 2/2014 | Yang |
| 2014/0050814 A1 | 2/2014 | Kang et al. |
| 2014/0055840 A1 | 2/2014 | Zang et al. |
| 2014/0078024 A1 | 3/2014 | Paolini, Jr. et al. |
| 2014/0078576 A1 | 3/2014 | Sprague |
| 2014/0104674 A1 | 4/2014 | Ting et al. |
| 2014/0192000 A1 | 7/2014 | Hung et al. |
| 2014/0204012 A1 | 7/2014 | Wu et al. |
| 2014/0206292 A1 | 7/2014 | Hung et al. |
| 2014/0210701 A1 | 7/2014 | Wu et al. |
| 2014/0231728 A1 | 8/2014 | Du et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0098124 A1 | 4/2015 | Li et al. |
| 2015/0177590 A1 | 6/2015 | Laxton |
| 2015/0185509 A1 | 7/2015 | Wang et al. |
| 2015/0262255 A1 | 9/2015 | Khajehnouri |
| 2015/0268531 A1 | 9/2015 | Wang et al. |
| 2015/0301246 A1 | 10/2015 | Zang et al. |
| 2015/0301425 A1 | 10/2015 | Du et al. |
| 2016/0059442 A1 | 3/2016 | Kang et al. |
| 2016/0077375 A1 | 3/2016 | Lin |
| 2016/0170106 A1 | 6/2016 | Wang et al. |
| 2016/0180777 A1 | 6/2016 | Lin et al. |
| 2021/0132459 A1 | 5/2021 | Bull |
| 2023/0109132 A1 * | 4/2023 | Du | H10K 50/856 |
| | | | 438/107 |

FOREIGN PATENT DOCUMENTS

| | | | |
|---|---|---|---|
| JP | 2011221404 A | | 11/2011 |
| KR | 20170112128 A | * | 10/2017 |
| WO | 1999067678 A2 | | 12/1999 |
| WO | 2000005704 A1 | | 2/2000 |
| WO | 2000036560 A1 | | 6/2000 |
| WO | 2000038000 A1 | | 6/2000 |
| WO | 2019162035 A1 | | 8/2019 |

OTHER PUBLICATIONS

European Patent Office, "Extended European Search Report", EP Appl. No. 22788915.1, Feb. 5, 2025.

* cited by examiner

ELECTROPHORETIC DISPLAY WITH LOW PROFILE EDGE SEAL

REFERENCE TO RELATED APPLICATIONS

This application claims priority to U.S. Provisional Patent Application No. 63/187,972, filed May 13, 2021, and U.S. Provisional Patent Application No. 63/175,935, filed Apr. 16, 2021. The entire contents of all patents and publications mentioned below are herein incorporated by reference in their entireties.

BACKGROUND OF INVENTION

The present invention relates to an electrophoretic display having an edge seal. This invention also provides processes for the production of such electrophoretic displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. [[Hereinafter, the term "microcavity electrophoretic display" may be used to cover both encapsulated and microcell electrophoretic displays.]] The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; 9,423,666; 9,428,649; 9,552,780; 9,557,623; 9,664,978; 9,670,367; 9,671,667; 9,688,859; 9,726,957; 9,732,231; 9,752,034; 9,765,015; 9,778,535; 9,778,537; 9,778,538; 9,835,926; 9,864,253; 9,953,588; 9,995,987; 10,025,157; 10,031,394; 10,040,954; 10,061,123; 10,062,337; 10,431,168; 10,444,590; and 10,514,583; and U.S. Patent Applications Publication Nos. 2003/0048522; 2003/0151029; 2003/0164480; 2004/0030125; 2005/0012980; 2009/0009852; 2009/0206499; 2009/0225398; 2010/0148385; 2011/0217639; 2012/0049125; 2013/0161565; 2013/0193385; 2013/0244149; 2014/0011913; 2014/0078024; 2014/0078573; 2014/0078576; 2014/0104674; 2014/0231728; 2015/0177590; 2015/0185509; 2015/0241754; 2015/0301425; and 2016/0170106;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Microcell structures, wall materials, and methods of forming microcells; see for example U.S. Pat. Nos. 6,672,921; 6,751,007; 6,753,067; 6,781,745; 6,788,452; 6,795,229; 6,806,995; 6,829,078; 6,833,177; 6,850,355; 6,865,012; 6,870,662; 6,885,495; 6,906,779; 6,930,818; 6,933,098; 6,947,202; 6,987,605; 7,046,228; 7,072,095; 7,079,303; 7,141,279; 7,156,945; 7,205,355; 7,233,429; 7,261,920; 7,271,947; 7,304,780; 7,307,778; 7,327,346; 7,347,957; 7,470,386; 7,504,050; 7,580,180; 7,715,087; 7,767,126; 7,880,958; 8,002,948; 8,154,790; 8,169,690; 8,441,432; 8,582,197; 8,891,156; 9,279,906; 9,291,872; 9,388,307; 9,436,057; 9,436,058; 9,470,917; 9,919,553; and 10,401,668; and U.S. Patent Applications Publication Nos. 2003/0175480; 2003/0175481; 2003/0179437; 2003/0203101; 2014/0050814; and 2016/0059442;

(d) Methods for filling and sealing microcells; see for example U.S. Pat. Nos. 6,545,797; 6,751,008; 6,788,449; 6,831,770; 6,833,943; 6,859,302; 6,867,898; 6,914,714; 6,972,893; 7,005,468; 7,046,228; 7,052,571; 7,144,942; 7,166,182; 7,374,634; 7,385,751; 7,408,696; 7,522,332; 7,557,981; 7,560,004; 7,564,614; 7,572,491; 7,616,374; 7,684,108; 7,715,087; 7,715,088; 8,179,589; 8,361,356; 8,520,292; 8,625,188; 8,830,561; 9,081,250; 9,346,987; and 9,759,978; and U.S. Patent Applications Publication Nos. 2002/0188053; 2004/0120024; 2004/0219306; and 2015/0098124;

(e) Films and sub-assemblies containing electro-optic materials; see for example U.S. Pat. Nos. 6,825,829; 6,982,178; 7,112,114; 7,158,282; 7,236,292; 7,443, 571; 7,513,813; 7,561,324; 7,636,191; 7,649,666; 7,728,811; 7,729,039; 7,791,782; 7,826,129; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; 9,238,340; 9,470,950; 9,554,495; 9,563,099; 9,733,540; 9,778,536; 9,835,925; 10,444,591; and 10,466,564; and U.S. Patent Applications Publication Nos. 2007/0237962; 2009/0168067; and 2011/0164301;

(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,346; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,560,004; 7,583,427; 7,598,173; 7,605,799; 7,636,191; 7,649,674; 7,667,886; 7,672,040; 7,688,497; 7,733,335; 7,785,988; 7,830,592; 7,839,564; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; 9,310,661; 9,419,024; 9,454,057; 9,529,240; 9,620,066; 9,632,373; 9,632,389; 9,666,142; 9,671,635; 9,715,155; 9,777,201; 9,778,500; 9,841,653; 9,897,891; 9,910,337; 9,921,422; 9,964,831; 10,036,930; 10,037,735; 10,048,563; 10,048,564; 10,190,743; 10,324,577; 10,365,533; 10,372,008; 10,429,715; 10,446,585; 10,466,564; 10,466,565; 10,495,940; 10,495,941; 10,503,041; and 10,509,294; and U.S. Patent Applications Publication Nos. 2002/0060321; 2004/0085619; 2004/0105036; 2005/0122306; 2005/0122563; 2006/0255322; 2007/0052757; 2009/0122389; 2009/0315044; 2010/0177396; 2011/0140744; 2011/0187683; 2011/0292319; 2014/0078024; 2014/0192000; 2014/0210701; 2014/0368753; 2015/0378235; and 2016/0077375; and International Application Publication No. WO 00/38000; European Patents Nos. 1,099,207 B1 and 1,145,072 B1;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; 9,423,666; 9,436,056; 9,459,510; 9,513,527; 9,541,814; 9,552,780; 9,640,119; 9,646,547; 9,671,668; 9,697,778; 9,726,959; 9,740,076; 9,759,981; 9,761,181; 9,778,538; 9,779,670; 9,779,671; 9,812,073; 9,829,764; 9,921,451; 9,922,603; 9,989,829; 10,032,419; 10,036,929; 10,036,931; 10,332,435; 10,339,876; 10,353,266; 10,366,647; 10,372,010; 10,380,931; 10,380,955; 10,431,168; 10,444,592; 10,467,984; 10,475,399; 10,509,293; and 10,514,583; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2015/0103394; 2015/0118390; 2015/0124345; 2015/0268531; 2015/0301246; 2016/0026062; 2016/0048054; and 2016/0116818;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; 9,412,314; 9,424,800; 9,460,666; 9,495,918; 9,501,981; 9,513,743; 9,514,667; 9,530,363; 9,542,895; 9,564,088; 9,612,502; 9,620,048; 9,620,067; 9,672,766; 9,721,495; 9,779,670; 9,881,564; 9,881,565; 9,886,886; 9,928,810; 9,966,018; 9,996,195; 10,002,575; 10,037,089; 10,380,954; 10,388,233; 10,475,396; and 10,504,457; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0322721; 2010/0194733; 2010/0194789; 2010/0220121; 2010/0265561; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2014/0009817; 2014/0085355; 2014/0204012; 2014/0218277; 2014/0240210; 2014/0253425; 2014/0293398; 2015/0262255; 2015/0262551; 2016/0071465; 2016/0093253; 2016/0140910; and 2016/0180777;

(i) Applications of displays; see for example U.S. Pat. Nos. 6,118,426; 6,473,072; 6,704,133; 6,710,540; 6,738,050; 6,825,829; 7,030,854; 7,119,759; 7,312,784; 7,705,824; 8,009,348; 8,011,592; 8,064,962; 8,162,212; 8,553,012; 8,973,837; 9,188,829; 9,197,704; 9,506,243; 9,880,646; and 10,331,005; and U.S. Patent Applications Publication Nos. 2002/0090980; 2004/0119681; 2007/0285385; 2013/0176288; 2013/0221112; 2013/0233930; 2013/0235536; 2014/0049808; 2014/0062391; 2014/0206292; and 2016/0035291; and International Application Publication No. WO 00/36560.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to SiPix Imaging, Inc.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including a particle-based electrophoretic display) which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E. I. du Pont de Nemours & Company, Wilmington DE, and such commercial materials may be used with good results in the front plane laminate.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer. The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

A further complication in driving electrophoretic displays is the need for so-called "DC balance". As discussed in the aforementioned U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method which does result in zero net time-averaged applied electric field across the electro-optic medium is conveniently referred to a "direct current balanced" or "DC balanced".

Figure 1:
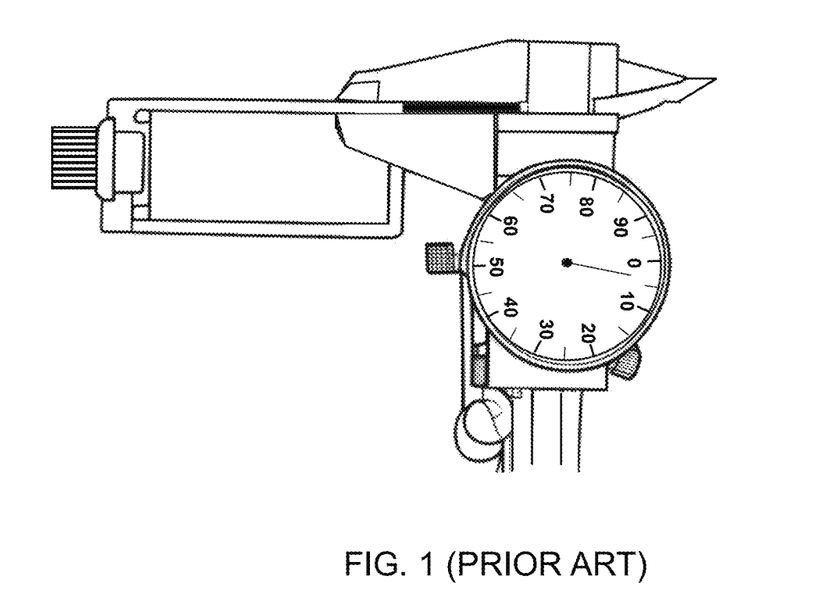
FIG. 1 shows a commercial electrophoretic display module and a caliper to measure the width of the edge seal.

The aforementioned U.S. Pat. No. 6,982,178 also describes the importance of protecting the electro-optic medium from environmental contaminants, since some electro-optic media are sensitive to humidity and ultra-violet radiation, and most such media are susceptible to mechanical damage. This published application illustrates, in FIG. 10, a process in which a protective film is laminated over a front plane laminate in the same lamination operation by which the front plane laminate is laminated to a backplane; such a protective film can protect the electro-optic medium against ingress of moisture, other liquids, and some gases. However, even with such a protective film, the edge of the electro-optic medium is still exposed to the environment, and this published application teaches that it is also advisable for the display to include an edge seal, which serves to prevent the ingress of moisture and other contaminants around the outer edges of the display. Various types of edge seals are illustrated in FIGS. 11-17 of U.S. Pat. No. 6,982,178. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Threebond 30Y-491 material (from Threebond Corporation, Cincinnati, OH) is especially preferred because of its favorable water vapor barrier properties, low viscosity at elevated temperature for easy dispensing of the edge seal material, good wetting characteristics, and manageable curing properties. Those skilled in the art and familiar with advanced sealants will be able to identify other sealants that offer comparable performance. An exemplary edge seal of a width of approximately 2.5 mm is shown in FIG. 1.

FIG. 20 of the aforementioned U.S. Pat. No. 6,982,178 shows a preferred form of electro-optic display having front protective layers and an edge seal. This preferred display comprises a thin film transistor (TFT) backplane generally similar to backplanes used with liquid crystal displays and having a matrix of pixel electrodes and associated thin film transistors and conductors for independently controlling the voltage applied to the pixel electrodes. A tape connect package is connected to a peripheral portion of the backplane and is provided with a driver integrated circuit (which controls the operation of the display); the tape connect package is also connected to a printed circuit board which contains additional circuitry for controlling the operation of the display.

On the upper surface (as illustrated in the aforementioned FIG. 20) of the backplane are disposed a layer of lamination adhesive, a layer of an electro-optic medium, a front electrode and a front substrate; the front electrode and front substrate are both conveniently formed from an indium-tin-oxide coated polymeric film, and as already noted such coated films are readily available commercially. The lamination adhesive layer, the electro-optic layer, the front electrode and front substrate are all derived from a front plane laminate which has been laminated to the backplane. One portion of the front electrode and front substrate extend beyond the electro-optic layer, and in the extended portion of the front electrode and front substrate, a conductive via formed from silver ink electrically connects the front electrode to circuitry provided on the backplane, while an adhesive layer secures the extended portion of the front electrode to the backplane.

Over the front substrate are disposed in succession a first layer of optically clear adhesive, a barrier film, a second layer of optically clear adhesive and a further, relatively thick protective film provided on its exposed surface with an anti-glare coating. The protective film acts to block ultra-violet radiation from reaching the electro-optic layer, and also prevents atmospheric moisture or other contaminants reaching this layer.

In order to form a complete seal around the electro-optic layer, the barrier film, the second layer of optically clear adhesive and the protective film are all made larger in both dimensions than the front substrate, so that these layers have peripheral portions which extend or "overhang" the outer edges of the front substrate. To complete the sealing of the electro-optic layer, a curable edge sealing material is injected, typically via a needle dispenser, into the area of the overhang, and cured to form an edge seal completely surrounding the electro-optic layer.

This type of edge seal is effective in preventing ingress of moisture and other environmental contaminants into the electro-optic medium. However, one of the advantages of encapsulated electrophoretic and other electro-optic media, for example rotating bichromal member and microcell media, is that they are sufficiently flexible to be used in flexible displays. The aforementioned type of edge seal, and similar edge seals, are not suitable for use in flexible displays since the edge seal itself imparts rigidity to the display.

Figure 2:
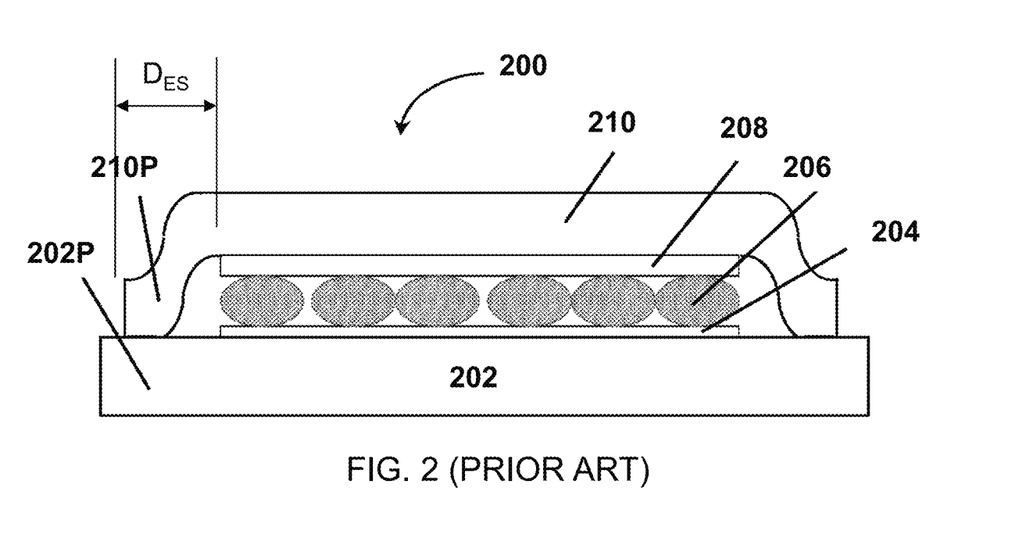
FIG. 2 shows a prior art electrophoretic display including a protective sheet and an edge seal. The width of the edge seal is shown as $D_{ES}$.

Further improvements to edge seals in electro-optic displays, generally, and electrophoretic displays, more specifically, can be found in U.S. Pat. No. 7,649,674, which is incorporated by reference herein in its entirety. The '674 patent describes a number of different edge seal designs, including overlapped sealing materials, single and double sealed protective sheets, single and double adhesive seals, and tape seals. For example, FIG. 2 shows a schematic section through a single sealed protective sheet display (generally designated 200) as disclosed in the '674 patent. This display 200 comprises a backplane 202, a lamination adhesive layer 204, a layer 206 of electro-optic material, and a front substrate 208 including a light-transmissive conductor, and a backplane 202, which may include an array of pixels coupled to thin-film transistors. Notably, the backplane 202 is quite a bit wider than layers 204-208 which have been deposited as a portion of front plane laminate, e.g., as described above. As a result of this construction, a substantial peripheral portion 202P extends well beyond the edges of the active area of the layer of electro-optic material 206. This extra area is often referred to as "dead" because it takes up a portion of the display, however it cannot switch between optical states (see FIG. 1). The width of the edge seal is denoted as $D_{ES}$, generally, in this document. In many instances, this dead area is covered by a decorative cover, such as a case, frame, or a bezel.

The display 200 further comprises a front protective or barrier sheet 210, which also includes a peripheral portion 210P extending outwardly beyond the edges of the layers 204-208. The peripheral portion 210P of the front barrier sheet 210 is sealed to the peripheral portion 202P of the backplane 202 by, for example, melting an appropriate portion of the front barrier sheet using, for example, laser or ultrasonic welding. Alternatively, the peripheral portions 210P and 202P could be secured to each other with an adhesive.

As is evident from FIG. 2, the edge seal width $D_{ES}$ is, in many ways, determined by the thickness and flexibility of the front protective or barrier sheet 210. Additionally, the method of sealing peripheral portion of the substrate 202P to the peripheral portion of the front protective or barrier sheet 210P, determines how close the substrate 202 can be cut from the edge of the layer of electro-optic material 206. If a welding method is used, it may be possible to reduce the overall width of the substrate, however if an adhesive is disposed between 210P and 202P, a larger edge seal may be required. (To be sure in mass produced display modules, such as in FIG. 1, the front plane laminate is cut to allow a sufficient edge for sealing to a previously-manufactured TFT backplane, not the other way around.)

As with many modern electronic displays, e.g., mobile phones, televisions, computer monitors, there is a demand for thinner and thinner borders for electrophoretic displays. In fact, in some applications, the edge seal width limits how wide a bezel or frame must be used. Additionally, when electrophoretic displays are tiled together, the edge seal width has a dramatic effect on customer acceptance. A large format high-resolution electrophoretic display having a non-switching line running through the middle is simply unacceptable for high end applications such as digital photography and artwork.

SUMMARY OF THE INVENTION

The present invention provides an electrophoretic display including an integrated backplane, a layer of a layer of electrophoretic material disposed adjacent the integrated backplane, a light-transmissive electrode layer adjacent the layer of electrophoretic material, and an integrated front barrier. The integrated backplane includes a back electrode layer, an adhesive layer, a metal foil layer, and a substrate. The integrated front barrier includes a top protective layer, a moisture barrier layer, and an optically-clear adhesive, wherein the optically-clear adhesive joins the moisture barrier layer and the integrated backplane to create an edge seal. In some embodiments, the integrated front barrier is deformed at the edges to envelope the layer of electrophoretic material and the light-transmissive electrode layer in a central portion while joining the moisture barrier layer and the integrated backplane along an edge of the electrophoretic display. In some embodiments, the distance between an edge of the light transmissive electrode layer and an outer edge of the integrated backplane is 1 mm or less. In some embodiments, the distance between the edge of the light transmissive electrode layer and the outer edge of the integrated backplane is 0.5 mm or less. In some embodiments, the electrophoretic display further includes a layer of lamination adhesive between the integrated backplane and the layer of electrophoretic material. In some embodiments, the metal foil is gold foil, silver foil, aluminum foil, or copper foil. In some embodiments, the back electrode layer comprises indium tin oxide, conductive carbon, graphene, nanotubes, metal whiskers, or poly(3,4-ethylenedioxythiophene). In some embodiments, the electrophoretic material includes two or more sets of charged particles that move in response to an electric field, wherein each set of charged particles has different optical characteristics. In some embodiments, the electrophoretic material includes three or more sets of charged particles that move in response to an electric field, wherein each set of charged particles has different optical characteristics.

In another aspect the invention provides an electrophoretic display including an integrated back barrier, a back electrode layer, a layer of electrophoretic material disposed adjacent the back electrode layer, and a light-transmissive electrode layer adjacent the layer of electrophoretic material on a side opposite from the back electrode layer, and an integrated front barrier. The integrated back barrier includes a back protective layer, a back moisture barrier layer, and a back lamination adhesive. The integrated front barrier includes a top protective layer, a front moisture barrier layer, and an optically-clear adhesive, wherein the optically-clear adhesive joins the front moisture barrier layer and the back electrode layer to create an edge seal. In some embodiments, the integrated front barrier is deformed at the edges to envelope the layer of electrophoretic material and the light-transmissive electrode layer in a central portion while joining the front moisture barrier layer and the back electrode layer along an edge of the electrophoretic display. In some embodiments, the distance between an edge of the light transmissive electrode layer and an outer edge of the integrated back barrier is 1 mm or less. In some embodiments, the distance between the edge of the light transmissive electrode layer and the outer edge of the integrated back barrier is 0.5 mm or less. In some embodiments, the electrophoretic display further comprises a layer of lamination adhesive between the back electrode layer and the layer of electrophoretic material. In some embodiments, the back electrode layer is light-transmissive. In some embodiments, the back electrode layer comprises indium tin oxide, conductive carbon, graphene, nanotubes, metal whiskers, or poly(3,4-ethylenedioxythiophene). In some embodiments, the electrophoretic material includes two or more sets of charged particles that move in response to an electric field, wherein each set of charged particles has different optical characteristics. In some embodiments, the electrophoretic material includes three or more sets of charged particles that move in response to an electric field, wherein each set of charged particles has different optical characteristics.

It should be stressed that all the accompanying drawings are schematic and not to scale. In particular, for ease of illustration, the thicknesses of the various layers in the drawings do not correspond to their actual thicknesses. Also, in all the drawings, the thicknesses of the various layers are greatly exaggerated relative to their lateral dimensions.

DETAILED DESCRIPTION

As discussed in the Background, there are several approaches to sealing electrophoretic displays using combinations of substrates, edge seal material and assembly techniques. The electrophoretic displays described herein provide narrow edge seals, thereby reducing the width of material at the edge of a sealed electrophoretic display that is inactive.

For the purpose of subsequent discussion, the term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In electrophoretic displays, it is highly desirable that the backplane provide sufficient barrier properties to prevent ingress of moisture and other contaminants through the non-viewing side of the display (the display is of course normally viewed from the side opposite from the backplane).

As discussed in the aforementioned U.S. Pat. Nos. 6,982,178 and 7,110,164 and Patent Publication No 2004/0155857, one preferred form of front substrate for electro-optic displays comprises a thin layer of ITO on PET, such coated films being readily available commercially. In such a front substrate, the ITO layer serves as a barrier material, but in practice commercial PET/ITO inevitably suffers from pinholes and cracks, through which moisture and other contaminants can penetrate to the electro-optic material.

To increase the sealing properties of such a PET/ITO or similar front substrate, it is desirable to laminate a redundant barrier layer on to the front substrate, this redundant barrier layer being formed of a homopolymer (for example, polychlorotrifluoroethylene, available from Honeywell Corporation under the Registered Trade Mark "ACLAR"), or a sputtered ceramic (for example $AlO_x$, available from Toppan Printing Company under the trade name Toppan GX Film). The redundant barrier layer should be thin to provide a flexible display, ideally about 12 µm, but could be as thick as 5 mil (127 µm) if sufficient flexibility is still available. Where an adhesive layer is required to attach the redundant barrier to the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives.

Alternatively, the barrier properties of a PET/ITO or similar front substrate may be improved by coating a redundant metal oxide layer (for example, an alumina layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur if one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., 3047 Orchard Parkway, San Jose, CA 95134 could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 µm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (sold under the Registered Trade Mark "SARAN"), polychlorotrifluoroethylene (sold under the Registered Trade Marks "ACLAR" and "CLARIS"), triacetyl cellulose, the material sold under the Registered Trade Mark "ARTON" by JSR Company, polyethersulfone (PES) and laminates of two or more of these materials. Suitable transparent conductive materials include ITO, organic conductive polymers such as Baytron P (Registered Trade Mark), carbon nanotubes, and other suitably conducting light transmissive conductors (transmission greater than 60 percent) having resistivities of less an about $10^4$ ohms/square.

Preferred displays of the present invention will now be described, though by way of illustration only, with reference to the accompanying drawings. In all cases, the electrophoretic layer may be an encapsulated electrophoretic layer, a polymer-dispersed electrophoretic layer, or any of the other types of electro-optic layer discussed above. The electrophoretic layer may be contained in microcells defined by microembossing a polymer, such as an acrylate, filling the microcells with an electrophoretic medium, and then sealing the microcells to contain the electrophoretic medium. A display may contain one or two (or more) lamination adhesive layers to attach the layers of the electrophoretic display to each other or to the front substrate and/or the backplane. The display may be viewed through either lamination adhesive layer, and the display may be assembled by direct coating and lamination, or by the use of front plane laminates, inverted front plane laminates, or double release films, as described above.

The type of electrophoretic material that is incorporated into the disclosed electrophoretic displays is not limited. For example, electrophoretic media of the invention may include two oppositely charged particles that have different optical characteristics, for example black and white. However, the colors incorporated into the electrophoretic medium are not limited and may include, for example, red, orange, yellow, green, blue, violet, brown, pink, magenta, and cyan, among others. The electrophoretic media may include three or more different sets of electrophoretic materials, such as described in U.S. Pat. Nos. 9,921,451 and 9,812,073, both of which are incorporated by reference in their entireties.

Figure 3:
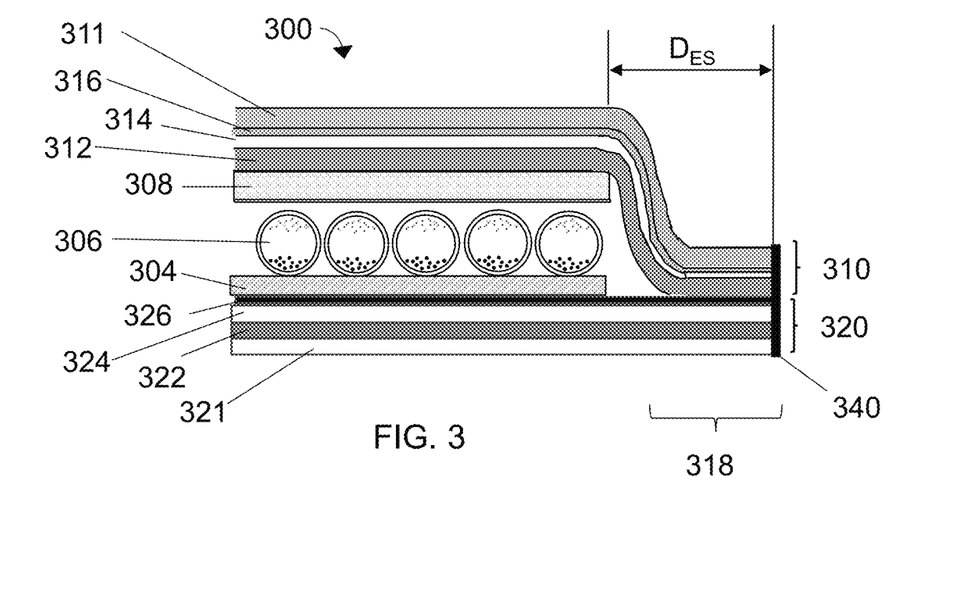
FIG. 3 illustrates an improved electrophoretic display design allowing for a reduced edge seal width.

FIG. 3 is a schematic illustration of an electrophoretic display of the invention (generally designated 300). This display 300 includes an integrated backplane 320, a layer of electrophoretic material 306, a layer of lamination adhesive 304, a light transmissive electrode layer 308, and an integrated front barrier 310. The integrated backplane 320 includes a back electrode layer 326, a polymer layer 324, a metal foil layer 322, and a substrate 321. The integrated backplane 320 may additionally include an adhesive layer between the metal foil layer 322 and the substrate 321. The light transmissive electrode layer 308 may comprise indium tin oxide (ITO) sputtered on thin polyethylene terephthalate (PET), or it may include another light-transmissive electrode material such as conductive carbon, graphene, nanotubes, metal whiskers, or poly(3,4-ethylenedioxythiophene (PEDOT). The PET may be 50 µm thick or thinner, e.g., 30 µm thick or thinner, 25 µm thick or thinner, or 20 µm thick or thinner. In some cases, the conductive material (such as metal whiskers) are distributed in a clear polymer matrix. The metal foil layer may include gold foil, silver foil, aluminum foil, or copper foil. The integrated backplane 320 is not limited to the construction described with respect to FIG. 3, and may additionally include one or more additional flexible substrates, one or more additional adhesive layers, and one or more additional metal layers. In some instances the integrated backplane 320 is flexible and can be deformed around the layer of electrophoretic material 306 and the light transmissive electrode layer 308 to join with the integrated front barrier 310.

The integrated front barrier 310 includes a top protective layer 311, a moisture barrier layer 314, and an optically-clear adhesive 312. The integrated front barrier may include a second optically-clear adhesive 316 between the top protective layer 311 and the moisture barrier layer 314. A peripheral portion 318 of the integrated front barrier is deformed to envelope the layer of electrophoretic material 306 and the light-transmissive electrode layer 308 in a central portion while joining the moisture barrier layer 314 and the integrated backplane 320 along an edge of the electrophoretic display. The top protective layer 311 may be any of clear deformable polymer material, such as polyethylene, polyacrylate, or polystyrene.

The edge seal distance $D_{ES}$ can be defined as the minimum distance between the edge of the light transmissive electrode layer 308 and the edge of the integrated front barrier 310, or simply the distance between the edge of the light-transmissive electrode layer 308 and the furthest extent of the top protective layer 311, which may, in some instances, extend slightly past the moisture barrier layer 314. Using the construction shown in FIG. 3, it is possible to achieve narrow edge seals, e.g., wherein $D_{ES}$ is 2 mm or smaller, e.g., 1 mm or smaller, e.g., 0.5 mm or smaller, e.g., 0.2 mm or smaller. When compared to the state of the art, e.g., FIG. 1, this represents an edge seal that is between 3 times and 10 times thinner. Such a narrow edge seal is beneficial when displays are integrated into other devices for use as color-changing ornamentation or indicators, or when displays are touching (e.g., tiled). Narrow edge seals may also be desired where surface area is limited, such as in jewelry or when integrated into closely-viewed surfaces, such as sunglasses or glasses for augmented reality. In some instances, the edge of the electrophoretic display will be further finished, e.g., with laser ablation or ion beam ablation to further reduce the width of the peripheral region 318. The exposed surface at the interface of the integrated front barrier 310 and the integrated backplane 320 may be sealed with an edge barrier 340, which may be a high density polymer sealant, such as an acrylic, such as a cyanoacrylate, or a polyurethane, or a sealing tape. In some embodiments, the edge barrier 340 may be a deposited material, such as silicon nitride, aluminum nitride, aluminum oxide, or silicon oxide.

Figure 4:
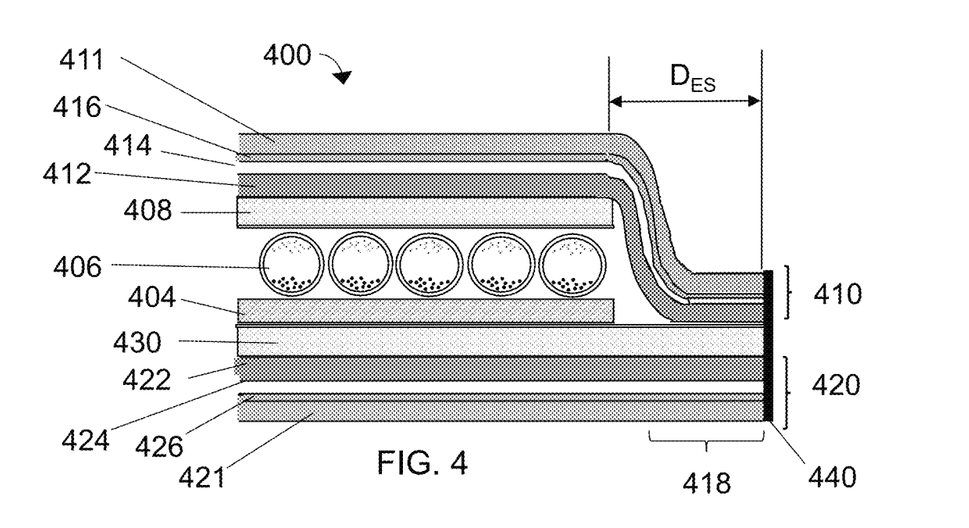
FIG. 4 illustrates an improved electrophoretic display design allowing for a reduced edge seal width.

A second embodiment of an electrophoretic display of the invention is shown in FIG. 4. This display 400 includes an integrated back barrier 420, a back electrode layer 430, a layer of electrophoretic material 406, a layer of lamination adhesive 404, a light transmissive electrode layer 408, and an integrated front barrier 410. The integrated back barrier 420 includes a back protective layer 421, a back moisture barrier layer 424, and a back lamination adhesive 422. The light transmissive electrode layer 408 and the back electrode layer 430 may both or optionally comprise indium tin oxide (ITO) sputtered on thin polyethylene terephthalate (PET), or they may include another light-transmissive electrode material such as conductive carbon, graphene, nanotubes, metal whiskers, or poly(3,4-ethylenedioxythiophene (PEDOT). The back electrode layer 430 may not be light-transmissive. In some embodiments, the light transmissive electrode layer 408 and the back electrode layer 430 are each 50 µm thick or thinner, e.g., 30 µm thick or thinner, 25 µm thick or thinner, or 20 µm thick or thinner.

The integrated front barrier 410 includes a top protective layer 411, a moisture barrier layer 414, and an optically-clear adhesive 412. The integrated front barrier 410 may include a second optically-clear adhesive 416 between the top protective layer 411 and the moisture barrier layer 414. A peripheral portion 418 of the integrated front barrier is deformed to envelope the layer of electrophoretic material 406 and the light-transmissive electrode layer 408 in a central portion while joining the moisture barrier layer 414 and the back electrode layer 430 along an edge of the electrophoretic display. The top protective layer 411 may be any of clear deformable polymer material, such as polyethylene, polyacrylate, or polystyrene.

Similar to FIG. 3, the width of an edge seal in the embodiment of FIG. 4 is the minimum distance between the edge of the light transmissive electrode 408 layer and the edge of the back electrode layer 430 or the integrated back barrier 420, whichever extends further outward from the edge of the light-transmissive electrode 408. The exposed surface at the interface of the integrated front barrier 410 and the integrated back barrier 420 may be sealed with an edge barrier 440, e.g., as described above with respect to FIG. 3.

Figure 5:
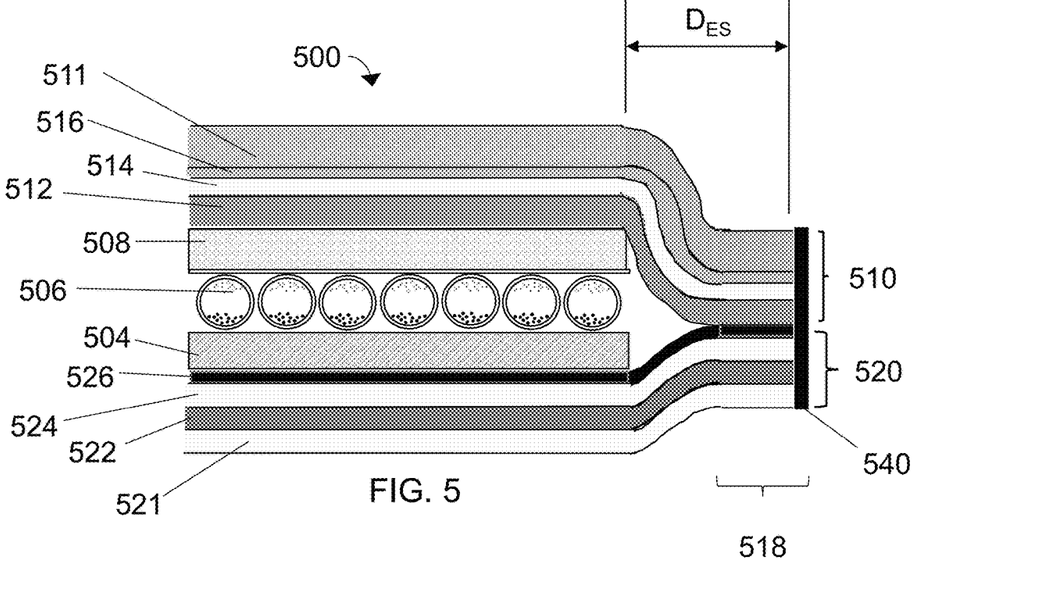
FIG. 5 illustrates an improved electrophoretic display design allowing for a reduced edge seal width.

An alternative edge seal to FIG. 3 is shown in FIG. 5. In FIG. 5 the integrated front barrier 510 is deformed at the edges toward the integrated backplane 520, while at the same time, the integrated backplane 520 is deformed toward the integrated front barrier 510. This configuration may be referred to as a "pinch edge" seal. Similar to FIG. 3, the display 500 of FIG. 5 includes an integrated backplane 520, a layer of electrophoretic material 506, a light transmissive electrode layer 508, and an integrated front barrier 510. The integrated backplane 520 includes a back electrode layer 526, a polymer layer 524, a metal foil layer 522, and a substrate 521. The integrated backplane 520 may additionally include an adhesive layer between the metal foil layer 522 and the substrate 521. The integrated backplane 520 is not limited to the construction described with respect to FIG. 5, and may additionally include one or more additional flexible substrates, one or more additional adhesive layers, and one or more additional metal layers. The integrated front barrier 510 includes a top protective layer 511, a moisture barrier layer 514, and an optically-clear adhesive 512. The integrated front barrier 510 may include a second optically-clear adhesive 516 between the top protective layer 511 and the moisture barrier layer 514. A peripheral portion 518 of the integrated front barrier is deformed to envelope the layer of electrophoretic material 506 and the light-transmissive electrode layer 508 in a central portion while joining the moisture barrier layer 514 and the integrated backplane 520 along an edge of the electrophoretic display. The top protective layer 511 may be any of clear deformable polymer material, such as polyethylene, polyacrylate, or polystyrene. Using the construction shown in FIG. 5, it is possible to achieve narrow edge seals, e.g., wherein $D_{ES}$ is 2 mm or smaller, e.g., 1 mm or smaller, e.g., 0.5 mm or smaller, e.g., 0.2 mm or smaller. In some instances, the edge of the electrophoretic display will be further finished, e.g., with laser ablation or ion beam ablation to further reduce the width of the peripheral region 518. The exposed surface at the interface of the integrated front barrier 510 and the integrated backplane 520 may be sealed with an edge barrier 540, which may be a high density polymer sealant, such as an acrylic, such as a cyanoacrylate, or a polyurethane, or a sealing tape.

Figure 6:
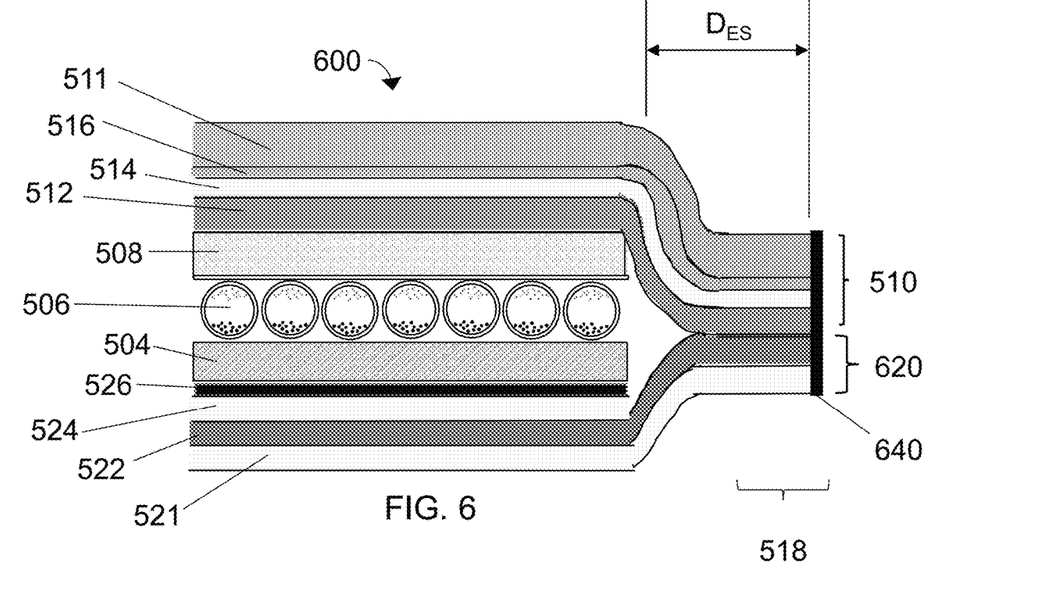
FIG. 6 illustrates an improved electrophoretic display design allowing for a reduced edge seal width.

In a different embodiment, a pinched edge seal similar to FIG. 5 can be formed after the back electrode layer 526 and the polymer layer 524 are removed from the portion of the display extending past the layer of electrophoretic material 506 and the lamination adhesive 504, as shown in FIG. 6. The integrated back barrier 620 includes a metal foil layer 522, and a substrate 521, and optionally an adhesive layer (not shown). As in FIG. 5, the integrated front barrier 510 includes a top protective layer 511, a moisture barrier layer 514, and an optically-clear adhesive 512. A peripheral portion 518 of the integrated front barrier 510 is deformed toward the integrated back barrier 620, while a portion of the integrated back barrier 620 is deformed toward the integrated front barrier 510 to envelope the layer of electrophoretic material 506, the light-transmissive electrode layer 508, and the layer of lamination adhesive 504 in a central portion while joining the moisture barrier layer 514 and the metal foil layer 524 along an edge of the electrophoretic display with optically-clear adhesive layer 512. The resulting stack is thinner, thereby allowing for a narrower edge seal. It should be understood that the deflection of the integrated front barrier 510 and the deflection of the integrated back barrier need not be symmetric.

Figure 7A:
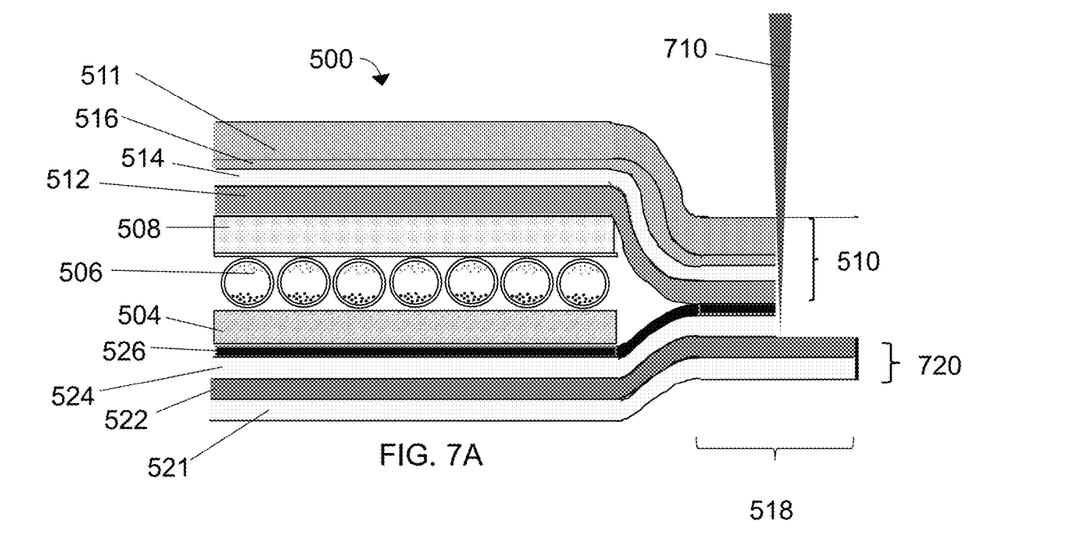
FIGS. 7A and 7B illustrate a method for reducing an edge seal width of the electrophoretic display module of FIG. 5.
Figure 7B:
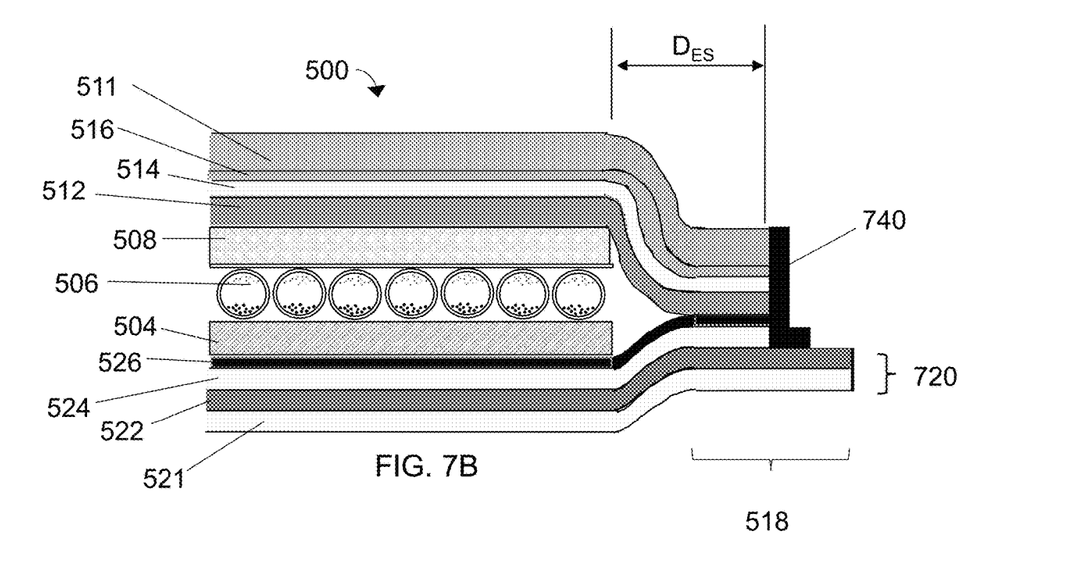

A method of forming a narrow pinched edge seal including an integrated backplane of display 500 is shown in FIG. 7A. In this instance, the peripheral portion 518 has been extended, which is merely a matter of using a larger segment of both the integrated front barrier 510 and the integrated backplane 520. After a seal is formed between the clear adhesive 512 and the back electrode layer 526, the edge seal is cut back with a laser 710 (or another cutting tool) to reduce the edge seal width. The resulting foil/backplane layer 720 may not provide as good of a seal, however, so an edge barrier 540 is formed that contacts both the exposed edge of the integrated front barrier 510 and the metal foil layer 522, as shown in FIG. 7B. This same edge seal method can be used in any of the displays above, e.g., as shown in FIGS. 3-6. Additionally, in some embodiments, the metal foil layer 522 can be electrically coupled to the back electrode layer 526 to allow for an easy external connection to the back electrode layer.

Figure 8A:
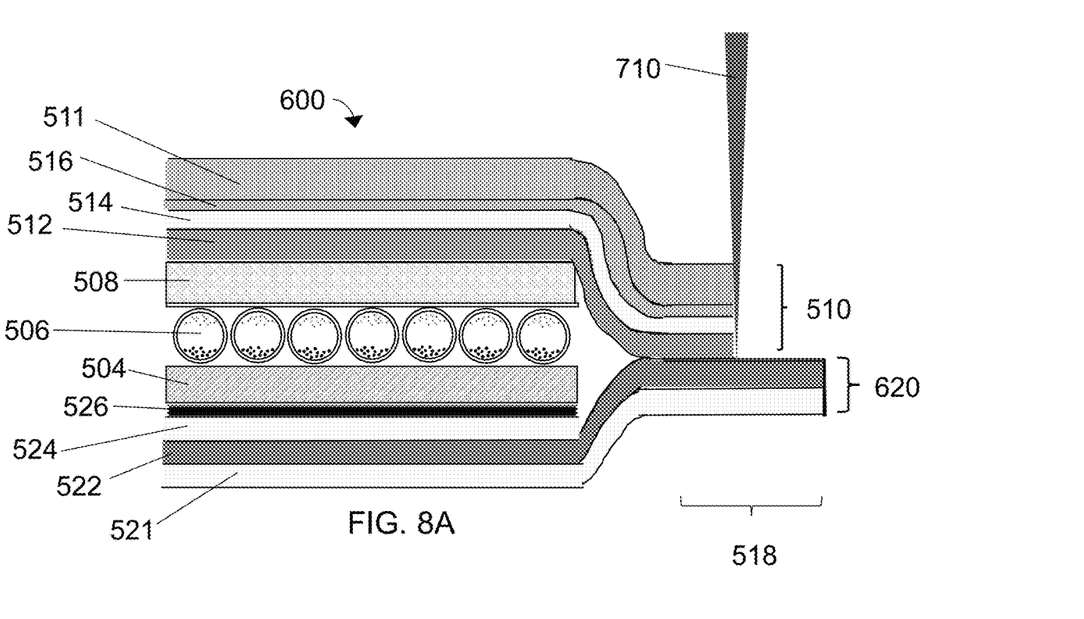
FIGS. 8A and 8B illustrate a method for reducing an edge seal width of the electrophoretic display module of FIG. 6.
Figure 8B:
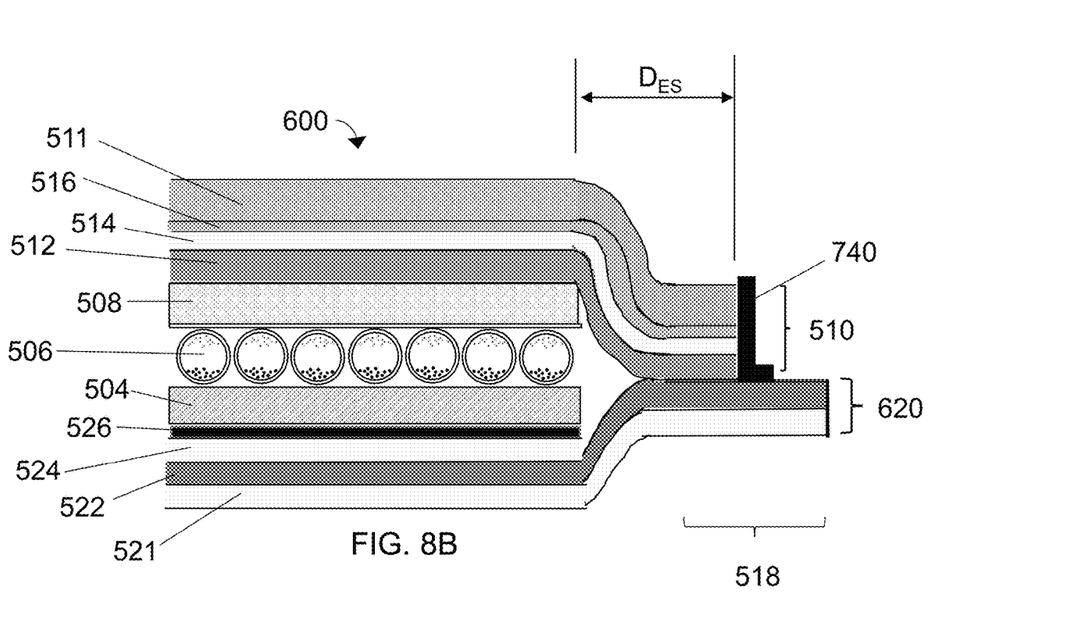

An alternate method of forming a narrow pinched edge seal including an integrated backplane of display 600 is shown in FIG. 8A. In this instance, the peripheral portion 518 has been extended, which is merely a matter of using a larger segment of both the integrated front barrier 510 and the back barrier layer 520. After a seal is formed between the moisture barrier layer 514 and the metal foil layer 522, the edge seal is cut back with a laser 710 (or another cutting tool) to reduce the edge seal width. In some embodiments, an edge barrier 740 is formed that contacts both the exposed edge of the integrated front barrier 510 and the metal foil layer 522, as shown in FIG. 8B. In some embodiments, the metal foil layer 522 can be electrically coupled to the back electrode layer 526 to allow for an easy external connection to the back electrode layer. In yet another alternate construction, the structure of FIG. 8B can be formed by cutting the back barrier layer 620 before assembling the back barrier layer 620 with the rest of the display 600 components, and then pinching together the integrated front barrier 510 and the back barrier layer 620 so that the moisture barrier layer 514 is sealed to the metal foil layer 522.

The electrophoretic displays of the invention may be substantially rigid or the materials may be chosen to allow the display to flex. Such a display does not require the type of thick, rigid sealing member found in some prior art displays, and, provided the backplane is sufficiently flexible, the peripheral portions of the backplane and barrier sheet, or the two barrier sheets, adhered to each other can remain flexible. In some applications, the entire stack may be light-transmissive except for portions of the electrophoretic medium, i.e., the charged pigment particles. In some embodiments, the electrophoretic medium may include only one type of particle and the display may be designed to provide suitable electric fields to cause the pigment particles to move to a "shutter" state in which the viewing area become substantially light-transmissive.

The electrode arrangements in the various types of displays of the present invention can be of any of the types described in the aforementioned E Ink and MIT patents and applications. Thus, for example, the displays may be of the direct drive type, in which the backplane is provided with a plurality of electrodes, each of which is provided with a separate connector by means of a which a controller can control the voltage applied to the specific electrode. In such a direct drive display, a single continuous front electrode is usually provided covering the whole display, although other front electrode arrangements are possible. Depending upon the type of electro-optic material used, it may be possible to use a passive matrix drive arrangement in which (typically) the backplane carries a plurality of elongate parallel electrodes ("column electrodes"), while on the opposed side of the electro-optic material there is provided a plurality of elongate parallel electrodes ("row electrodes") running at right angles to the column electrodes, the overlap between one specific column electrode and one specific row electrode defining one pixel of the display. The present displays may also be of the active matrix type, typically with a single continuous front electrode covering the whole display and a matrix of pixel electrodes on the backplane, each pixel electrode defining one pixel of the display and having an associated transistor or other non-linear element, the active matrix display being scanned in the conventional manner to write the display in a row-by-row fashion. Finally, the present display may also be of the stylus-driven type. with (typically) a single electrode on the backplane and no permanent front electrode, writing of the display being effected by moving a stylus across the front surface of the display.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

Numerous changes and modifications can be made in the preferred embodiments of the present invention already described without departing from the scope of the invention. Accordingly, the foregoing description is to be construed in an illustrative and not in a limitative sense.

The invention claimed is:

1. An electrophoretic display comprising:
an integrated backplane including:
a back electrode layer,
a polymer layer,
a metal foil layer, and
a substrate;
a layer of electrophoretic material disposed adjacent the integrated backplane;
a light-transmissive electrode layer adjacent the layer of electrophoretic material; and
an integrated front barrier including:
a top protective layer,
a moisture barrier layer, and
an optically-clear adhesive, wherein the optically-clear adhesive joins the moisture barrier layer and the integrated backplane to create an edge seal,
wherein the integrated front barrier is deformed at the edges toward the integrated backplane to envelope the layer of electrophoretic material and the light-transmissive electrode layer in a central portion while joining the moisture barrier layer and the integrated backplane along an edge of the electrophoretic display, and
wherein the distance between an edge of the light transmissive electrode layer and an outer edge of the integrated backplane is 0.5 mm or less.

2. The electrophoretic display of claim 1, further comprising a layer of lamination adhesive between the integrated backplane and the layer of electrophoretic material.

3. The electrophoretic display of claim 1, wherein the metal foil is gold foil, silver foil, aluminum foil, or copper foil.

4. The electrophoretic display of claim 1, wherein the back electrode layer comprises indium tin oxide, conductive carbon, graphene, nanotubes, metal whiskers, or poly(3,4-ethylenedioxythiophene).

5. The electrophoretic display of claim 1, wherein the electrophoretic material includes two or more sets of charged particles that move in response to an electric field, wherein each set of charged particles has different optical characteristics.

6. The electrophoretic display of claim 1, wherein the electrophoretic material includes three or more sets of charged particles that move in response to an electric field, wherein each set of charged particles has different optical characteristics.

7. An electrophoretic display comprising:
an integrated back barrier including:
a back protective layer, and
a back moisture barrier layer;
a back electrode layer;
a layer of electrophoretic material disposed adjacent the back electrode layer;
a light-transmissive electrode layer adjacent the layer of electrophoretic material on a side opposite from the back electrode layer; and
an integrated front barrier including:
a top protective layer,
a front moisture barrier layer, and
an optically-clear adhesive, wherein the optically-clear adhesive joins the front moisture barrier layer and the back electrode layer to create an edge seal,
wherein the integrated front barrier is deformed toward the integrated back barrier at the edges to envelope the layer of electrophoretic material and the light-transmissive electrode layer in a central portion while joining the front moisture barrier layer and the back electrode layer along an edge of the electrophoretic display, and
wherein the distance between an edge of the light transmissive electrode layer and an outer edge of the integrated back barrier is 0.5 mm or less.

8. The electrophoretic display of claim 7, further comprising a layer of lamination adhesive between the back electrode layer and the layer of electrophoretic material.

9. The electrophoretic display of claim 7, wherein the back electrode layer is light-transmissive.

10. The electrophoretic display of claim 7, wherein the back electrode layer comprises indium tin oxide, conductive carbon, graphene, nanotubes, metal whiskers, or poly(3,4-ethylenedioxythiophene).

11. The electrophoretic display of claim 7, wherein the electrophoretic material includes two or more sets of charged particles that move in response to an electric field, wherein each set of charged particles has different optical characteristics.

12. The electrophoretic display of claim 7, wherein the electrophoretic material includes three or more sets of charged particles that move in response to an electric field, wherein each set of charged particles has different optical characteristics.

* * * * *